(12) United States Patent
Tang et al.

(10) Patent No.: US 7,792,858 B2
(45) Date of Patent: Sep. 7, 2010

(54) COMPUTER-IMPLEMENTED METHOD AND SYSTEM FOR COMBINING KEYWORDS INTO LOGICAL CLUSTERS THAT SHARE SIMILAR BEHAVIOR WITH RESPECT TO A CONSIDERED DIMENSION

(75) Inventors: Xiaofeng Tang, San Jose, CA (US); Salvador Duran, San Jose, CA (US); Joel R. Minton, Campbell, CA (US)

(73) Assignee: eBay Inc., San Jose, CA (US)

( * ) Notice: Subject to any disclaimer, the term of this patent is extended or adjusted under 35 U.S.C. 154(b) by 769 days.

(21) Appl. No.: 11/427,090

(22) Filed: Jun. 28, 2006

(65) Prior Publication Data

US 2007/0143266 A1 Jun. 21, 2007

Related U.S. Application Data

(60) Provisional application No. 60/743,058, filed on Dec. 21, 2005, provisional application No. 60/743,059, filed on Dec. 21, 2005, provisional application No. 60/743,060, filed on Dec. 21, 2005.

(51) Int. Cl.
G06F 17/30 (2006.01)
G06F 7/00 (2006.01)

(52) U.S. Cl. .................. 707/780; 707/723; 707/709

(58) Field of Classification Search .................. 707/101, 707/3
See application file for complete search history.

(56) References Cited

U.S. PATENT DOCUMENTS

| | | | |
|---|---|---|---|
| 6,499,030 B1 * | 12/2002 | Igata | 707/6 |
| 6,704,727 B1 | 3/2004 | Kravets | |
| 6,826,572 B2 | 11/2004 | Colace et al. | |
| 6,876,997 B1 | 4/2005 | Rorex et al. | |
| 7,007,014 B2 | 2/2006 | Liu et al. | |
| 7,225,182 B2 | 5/2007 | Paine et al. | |
| 2002/0013763 A1 | 1/2002 | Harris | |
| 2002/0038241 A1 * | 3/2002 | Hiraga | 705/14 |
| 2002/0038282 A1 | 3/2002 | Montgomery | |
| 2002/0072895 A1 * | 6/2002 | Imanaka et al. | 704/9 |
| 2002/0111847 A1 | 8/2002 | Smith, II | |
| 2002/0116313 A1 | 8/2002 | Detering | |

(Continued)

OTHER PUBLICATIONS

U.S. Appl. No. 11/427,097, Non-Final Office Action mailed Apr. 18, 2008, 20 pgs.

(Continued)

*Primary Examiner*—Kuen S Lu
(74) *Attorney, Agent, or Firm*—Schwegman, Lundberg & Woessner, P.A.

(57) ABSTRACT

A computer-implemented method and system for combining keywords into logical clusters that share a similar behavior with respect to a considered dimension are disclosed. Various embodiments are operable to order a list of keywords from high activity to low activity, partition the list into at least two sets, a head partition including keywords with an activity level above a predefined threshold, a tail partition including the remainder of the keywords in the list, model the keywords in the head partition based on a set of variables, score the keywords in the head partition based on the modeling, and cluster head partition keywords with tail partition keywords having at least one common variable into at least one keyword cluster.

30 Claims, 8 Drawing Sheets

U.S. PATENT DOCUMENTS

| | | | |
|---|---|---|---|
| 2002/0128949 | A1 | 9/2002 | Wiesehuegel et al. |
| 2002/0188694 | A1* | 12/2002 | Yu .......................... 709/218 |
| 2003/0055729 | A1 | 3/2003 | Bezos et al. |
| 2003/0055816 | A1 | 3/2003 | Paine et al. |
| 2003/0088525 | A1 | 5/2003 | Velez et al. |
| 2003/0105677 | A1 | 6/2003 | Skinner |
| 2004/0068460 | A1 | 4/2004 | Feeley et al. |
| 2004/0088241 | A1 | 5/2004 | Rebane et al. |
| 2004/0199496 | A1 | 10/2004 | Liu et al. |
| 2004/0230574 | A1 | 11/2004 | Kravets |
| 2005/0065844 | A1 | 3/2005 | Raj et al. |
| 2005/0071325 | A1 | 3/2005 | Bem |
| 2005/0097024 | A1 | 5/2005 | Rainey |
| 2005/0137939 | A1 | 6/2005 | Calabria et al. |
| 2005/0144064 | A1 | 6/2005 | Calabria et al. |
| 2005/0144065 | A1 | 6/2005 | Calabria et al. |
| 2005/0223000 | A1 | 10/2005 | Davis et al. |
| 2005/0228797 | A1 | 10/2005 | Koningstein et al. |
| 2006/0004628 | A1 | 1/2006 | Axe et al. |
| 2006/0069784 | A2* | 3/2006 | Hsu et al. ................. 709/228 |
| 2006/0149623 | A1 | 7/2006 | Badros et al. |
| 2006/0206516 | A1 | 9/2006 | Mason |
| 2007/0027754 | A1 | 2/2007 | Collins et al. |
| 2007/0156757 | A1 | 7/2007 | Tang et al. |
| 2007/0162379 | A1 | 7/2007 | Skinner |

OTHER PUBLICATIONS

U.S. Appl. No. 11/427,097, Response filed Aug. 18, 2008 to Non-Final Office Action mailed Apr. 18, 2008, 18 pgs.

U.S. Appl. No. 11/427,097, Final Office Action mailed on Nov. 28, 2008, 25 pgs.

U.S. Appl. No. 11/427,097, Non-Final Office Action mailed May 14, 2009, 23 pgs.

U.S. Appl. No. 11/427,097, Response filed Mar. 30, 2009 to Final Office Action mailed Nov. 28, 2008, 12 pgs.

U.S. Appl. No. 11/517,886, Final Office Action mailed Feb. 6, 2009, 12 pgs.

U.S. Appl. No. 11/517,886, Non-Final Office Action mailed Jun. 9, 2008, 16 pgs.

U.S. Appl. No. 11/517,886, Response filed Oct. 9, 2008 to Non-Final Office Action mailed Jun. 9, 2008, 14 pgs.

U.S. Appl. No. 11/517,886, Response filed Jun. 8, 2009 to Final Office Action mailed Feb. 6, 2009, 13 pgs.

"U.S. Appl. No. 11/427,097, Final Office Action Mailed Oct. 30, 2009", 23 pgs.

"U.S. Appl. No. 11/427,097, Response filed Mar. 1, 2010 to Final Office Action mailed Oct. 30, 2009", 18 pgs.

"U.S. Appl. No. 11/427,097, Response filed Aug. 14, 2009 to Non Final Office Action mailed May 14, 2009", 13 pgs.

"U.S. Appl. No. 11/517,886, Non-Final Office Action mailed Aug. 6, 2009", 12 Pgs.

"U.S. Appl. No. 11/517,886, Notice of Allowance mailed Feb. 22, 2010", 8.

"U.S. Appl. No. 11/517,886, Response filed Nov. 6, 2009 to Non Final Office Action mailed Aug. 6, 2009", 12 pgs.

* cited by examiner

| keyword | Global Dimensions | | | | | | | Source Specific | | | | | Traffic | | Clustering | |
|---|---|---|---|---|---|---|---|---|---|---|---|---|---|---|---|---|
| | Yahoo volume | Host site volume | # host site search results | aff kw? | international kw? | natural kw? | etc. | affiliate ID | which country | country revenue | country cost | etc. | trafficked | cpc | Category Affinity | VCRU by kw |
| keyword 1 | 100 | 50 | 200 | 1 | | 1 | | 123 | na | na | na | na | | | | |
| keyword 2 | 3 | 0 | 3 | | | | | na | na | na | na | na | | | | |
| etc. | | | | | | | | | | | | | | | | |

Figure 5

| Head | eRPC$_{kw}$ | Head V$_b$ | Cluster | eRPC$_{Cluster}$ | Tail KW | Tail V$_b$ | eRPC$_{kw}$ |
|---|---|---|---|---|---|---|---|
| KW1 | $1.00 | 10 | 1 | $2.40 | KW1 | 5 | $2.19 |
| KW2 | $2.00 | 10 | | | KW2 | 10 | $2.26 |
| KW3 | $3.00 | 30 | | | KW3 | 20 | $2.33 |
| KW1 | $1.00 | 10 | 2 | $2.25 | KW1 | 15 | $2.19 |
| KW2 | $2.00 | 10 | | | KW2 | 15 | $2.26 |
| KW3 | $3.00 | 20 | | | KW3 | 20 | $2.33 |
| KW1 | $1.00 | 20 | 3 | $2.00 | KW1 | 10 | $2.19 |
| KW2 | $2.00 | 20 | | | KW2 | 5 | $2.26 |
| KW3 | $3.00 | 20 | | | KW3 | 0 | $2.33 |

Figure 8

COMPUTER-IMPLEMENTED METHOD AND SYSTEM FOR COMBINING KEYWORDS INTO LOGICAL CLUSTERS THAT SHARE SIMILAR BEHAVIOR WITH RESPECT TO A CONSIDERED DIMENSION

This patent application claims the benefit of priority, under 35 U.S.C. Section 119(e), of U.S. Provisional Patent Application Ser. No. 60/743,058, filed on Dec. 21, 2005, and titled, "A Computer-implemented Method and System for Combining Keywords Into Logical Clusters that Share Similar Behavior With Respect to a Considered Dimension", and assigned to the same assignee as the present patent application.

This patent application claims the benefit of priority, under 35 U.S.C. Section 119(e), of U.S. Provisional Patent Application Ser. No. 60/743,059, filed on Dec. 21, 2005, and titled, "A Computer-implemented Method and System for Enabling the Automated Selection of Keywords for Rapid Keyword Portfolio Expansion", and assigned to the same assignee as the present patent application.

This patent application claims the benefit of priority, under 35 U.S.C. Section 119(e), of U.S. Provisional Patent Application Ser. No. 60/743,060, filed On Dec. 21, 2005, and titled, "A Computer-implemented Method and System For Managing Keyword Bidding Prices", and assigned to the same assignee as the present patent application.

BACKGROUND

Cross-Reference to Related Patent Applications

This patent application is related to U.S. patent application Ser. No. 11/427,097, filed on Jun. 28, 2006, and titled, "A Computer-implemented Method and System for Enabling the Automated Selection of Keywords for Rapid Keyword Portfolio Expansion", and assigned to the same assignee as the present patent application.

This patent application is related to U.S. patent application Ser. No. 11/517,886, filed on Sep. 8, 2006, and titled, "A Computer-implemented Method and System for Managing Keyword Bidding Prices", and assigned to the same assignee as the present patent application.

1. Technical Field

This disclosure relates to methods and systems supporting keyword advertising associated with Internet search engine usage and keyword query submittal by a user. More particularly, the present disclosure relates to automated bidding for search keywords.

2. Related Art

An increasingly popular way of delivering Internet advertisements is to tie the advertisement to search query results triggered by the entry of particular keywords (e.g. search queries) by a user. In order to target advertising accurately, advertisers or vendors pay to have their advertisements presented in response to certain kinds of queries—that is, their advertisements are presented when particular keyword combinations are supplied by the user of the search engine.

For example, when a user searches for "baseball cards," using a search engine such as Google or other well-known search engines, in addition to the usual query results, the user may also be shown a number of sponsored results. These may be paid advertisements for businesses, generally offering related goods and/or services. In this example, the advertisements may therefore be directed to such things as baseball card vendors, collectibles shops, sports memorabilia, or even sporting goods or event tickets. Of course, the advertisements may be directed to seemingly less related subject matter. While the presentation varies somewhat between search engines, these sponsored results are usually shown a few lines above, or on the right hand margin of the regular results. Although, the sponsored results may also be placed anywhere in conjunction with the regular results.

Keyword advertising is growing as other types of web advertising are generally declining. It is believed there are at least several features that contribute to its success. First, sponsored results are piggybacked on regular results, so they are delivered in connection with a valuable, seemingly objective, service to the user. By contrast, search engines that are built primarily on sponsored results have not been as popular. Second, the precision of the targeting of the advertising means the user is more likely to find the advertisements useful, and consequently may perceive the advertisements as more of a part of the service than as an unwanted intrusion. Unlike banners and pop-up advertisements, which are routinely ignored or dismissed, users appear more likely to click through these sponsored results (e.g., keyword advertisements). Third, the targeting is based entirely on the current query, and not on demographic data developed over longer periods of time. This kind of targeting is timelier and more palatable to users with privacy concerns. Fourth, these advertisements reach users when they are searching, and therefore when they are more open to visiting new web sites.

Companies, such as Google of Mountain View, Calif., which offers a search engine and Overture of Pasadena, Calif. (now Yahoo Search), which aggregates advertising for search engines as well as offering its own search engine, use an auction mechanism combined with a pay-per-click (PPC) pricing strategy to sell advertising. This model is appealing in its simplicity. Advertisers bid in auctions for placement of their advertisements in connection with particular keywords or keyword combinations. The amount they bid (e.g., cost-per-click (CPC)) is the amount that they are willing to pay for a click-through on their link. For example, in one PPC pricing strategy, if company A bids $1.10 for the keyword combination "baseball cards", then its advertisement may be placed above a company bidding $0.95 for the same keyword combination. Only a selected number of bidders' advertisements may be shown. The simplicity of the model makes it easy for an advertiser to understand why an advertisement is shown, and what bid is necessary to have an advertisement shown. It also means that advertisers are charged only for positive click-through responses.

Both Google and Overture offer tools to help users identify additional keywords based on an initial set of keywords. The Overture model supplies keywords that actually contain the keyword (e.g. for bicycle one can get road bicycle, Colonago bicycle, etc.). Google, on the other hand, performs some kind of topic selection, which they claim is based on billions of searches.

Both Google and Overture offer tools to help users manage their bids. Google uses click-through rate and PPC to estimate an expected rate of return which is then used to dynamically rank the advertisements. Overture uses the PPC pricing strategy to rank advertisements, but monitors the click-through rate for significantly under performing advertisements.

Because Google dynamically ranks the advertisements based on click-through and PPC, advertisers cannot control their exact advertisement position with a fixed PPC. To insure a top position, the advertiser may be willing to pay a different price that is determined by their own click through rate as well as the competitors click-though rates and PPC. Overture uses a fixed price model, which insures fixed position for fixed price.

If a set of keywords that have not been selected by any of the advertisers is issued as a search term, Google may attempt to find the best matching selected set of keywords and display its associated advertisements. For example, let's say a user searches on "engagement ring diamond solitaire." However, there are no advertisers bidding on this search term. The expanded matching feature may then match (based on term, title, and description) selected listings from advertisers that have bid on search terms (e.g. keyword combinations) like "solitaire engagement ring" and "solitaire diamond ring."

A number of third parties provide services to Overture customers to identify and select keywords and track and rank bids. For example, BidRank, Dynamic Keyword Bid Maximizer, Epic Sky, GoToast, PPC BidTracker, PPC Pro, Send Traffic, and Sure Hits. There are a small number of pay-per-bid systems. For example, Kanoodle is a traditional pay-per-bid system like Overture. Other examples, include Sprinks and FindWhat.

The Sprinks brand system, ContentSprinks™, produces listings that rely on context, as opposed to one-to-one matching with a keyword. The user chooses topics, rather than keywords. The Sprinks web site asserts, "Since context is more important than an exact match, you can put your offer for golf balls in front of customers who are researching and buying golf clubs, and your listing may still be approved, even though it's not an exact match." This is a pay-per-bid model, like Overture, and has been used by About.com, iVillage.com and Forbes.com. The Sprinks brand system, Keyword-Sprinks™, is a traditional pay-per-bid model for keywords and phrases.

FindWhat has a BidOptimizer that shows the bids of the top five positions so that a user can set their bid price for a keyword to be at a specific position. It does not continually adjust bids like Google and Overture.

In addition, there is a system called Wordtracker for helping users to select keywords. The Wordtracker system at <www.wordtracker.com> provides a set of tools to help users to identify keywords for better placement of advertisements and web pages in search engines, both regular and pay-per-bid. Wordtracker provides related words with occurrence information, misspelled word suggestions based on the number of occurrences of the misspelled words, and tools for keeping track of possible keyword/key phrase candidates. The related words are more than variants. On the web site, an example of related keywords for "golf" includes pga, Ipga, golf courses, tiger woods, golf clubs, sports, jack nicklaus, and titleist, as well as phrases that include the term "golf," such as golf clubs, golf courses, golf equipment, used golf clubs, golf tips, golf games, and vw.golf. Wordtracker displays the bid prices for a keyword on selected pay-per-bid search engines. It also displays the number of occurrences of search terms by search engine so the keywords can be tuned to each search engine.

Wordtracker can be a useful tool, but it does not automate certain aspects of the advertiser's decision-making, bidding, and placement of advertisements. Currently, an advertiser may participate in every auction of relevant keywords. In the example above, a company offering sporting goods may want its advertisements to be placed with a variety of keywords corresponding to common queries related to sports equipment, training, events, etc. These keywords vary in their relevance to the company's business, in their "yield" of productive click-through visits to the company's web site, and their cost to the company (based on competition in the auctions). The multiplicity of keyword combinations and the multiplicity of considerations for each keyword combination create a number of opportunities for automation support mechanisms for advertisement placement decision making.

In the process of bidding in keyword auctions, advertisers may compete in ways that are mutually detrimental. There may be better joint strategies that are less costly, or involve alternative keywords, but the individual bidders do not easily discover these joint strategies. Even when the individual bidders know good joint strategies, the individual bidders may not have a strong incentive to pursue these strategies without some assurance of cooperation.

If the process of selecting and bidding for keyword combinations for an advertiser was automated or more automated, it likely that less guidance would be required from the advertiser and that advertisements would be placed on more effective keywords. It is also likely that such automation would help maximize return on advertising investment (ROAI), increase the number sponsored keywords, and maximize click-through rates for keyword advertisements.

Several published U.S. patent applications disclose concepts related to bidding for a position of a keyword advertisement in a search results list. For example, U.S. Patent Application Pub. No. U.S. 2005/0144064 A1 discloses a method of generating a bid for an advertiser for placement of an advertisement in association with a search results list, where the search results list is generated in response to a search query. In one embodiment, the method includes: a) associating the at least one keyword with the bid, wherein the search query is associated with the at least one keyword, and b) determining an amount of the bid, associated with the at least one keyword, for placement of the advertisement in association with the search results list generated in response to the search query associated with the at least one keyword. The bid is determined based at least in part on bids by other advertisers in competition with the first advertiser for placement of other advertisements with an expectation that the determined bid may elicit a desired change in the bids by the other advertisers.

U.S. Patent Application Pub. No. U.S. 2005/0144065 A1 discloses a method of coordinating one or more bids for one or more groups of advertisers for placement of at least one advertisement in association with a search results list. The search results list is generated in response to a search query. The method includes: a) collecting information from at least two advertisers in the advertiser group and b) devising a joint strategy for the advertiser group for bidding in the keyword auction. In another embodiment, a method of generating a bid for a first advertiser for placement of a first advertisement in association with a search results list is provided. In another embodiment, an apparatus for generating the bid for the first advertiser is provided. Is still another embodiment, a method of coordinating bids from a first advertiser and a second advertiser for placement of at least one advertisement in association with a first search results list is provided.

U.S. Patent Application Pub. No. U.S. 2005/0071325 A1 discloses a system wherein the number of ads potentially relevant to search query information may be increased by relaxing the notion of search query keyword matching. This may be done, for example, by expanding a set of ad request keywords to include both query keywords (or derivatives of a root thereof) and related keywords. The related keywords may be words with a relatively high co-occurrence with a query keyword in a group of previous search queries (e.g., search queries in a session). The scores of ads with keyword targeting criteria that matched words related to words in a search query, but not the words from the search query, may be discounted. That is, the scores of ads served pursuant to a relaxed notion of matching may be discounted relative to the scores of ads served pursuant to a stricter notion of matching. This may be done by using a score modification parameter, such as an ad performance multiplier (for cases in which an ad score is a function of ad performance information). The score modification parameter may be updated to reflect observed performance data, such as performance data associated with {word-to-related word} mappings.

U.S. Patent Application Pub. No. U.S. 2005/0137939 A1 discloses a server-based method of automatically generating a plurality of bids for an advertiser for placement of at least one advertisement in association with a search results list. The method includes: a) receiving at least one candidate advertisement, b) creating a list of candidate keywords, c) estimating a click-through rate for each advertisement-keyword pair, d) calculating a return on advertising investment (ROAI) for each advertisement-keyword pair, and e) calculating a bid amount for each advertisement-keyword pair. In another aspect, a server-based method of generating a bid for placement of an advertisement in association with a search results list is provided. In other aspects, a method of selecting one or more keywords in conjunction with the bid is provided as well as a method of determining a return on advertising investment (ROAI) information for an advertiser in conjunction with the bid is provided.

U.S. Patent Application Pub. No. U.S. 2004/0088241 A1 discloses a "Keyword Automated Bidding System" (KABS) which, among other things, provides an intelligent system for bidders for a ranking in web search results list to determine bids and bidding strategies that maximize return on bid investments and help direct allocation of available funds for bids to keywords that lead to more optimal returns. An example embodiment is designed to generate a scalable solution to the problem of selecting the proper set of keywords to bid and the proper values of such bids for thousands of keywords on third party sites such as Overture and Google.com. The scalable solution is generated according to operator-defined model constraints and utility functions. In one embodiment, KABS maximizes profit by maximizing the Margin Rate to a bidder which is the difference in the aggregate Revenue per Redirect (RPR) from the merchants and the Cost per Click (CPC) that may be paid to the traffic source. The prime constraint on this solution is the total CPC dollar amount that is budgeted over a fixed interval of time (day, week, etc.). A major computational subsystem of KABS performs the estimation of arrival or click-thru rates for each keyword or category of keywords as a function of their display ranks on the source site. It is the form and level of this estimated function that is critical in the selection of the proper display rank from an active bid table a spider retrieves for each keyword. The KABS operator may be required to provide the inputs that direct and constrain the system's operation. Among these is the comprehensive set of keywords of interest from which the proper subset may be computed. Other key inputs include the frequencies of executing the various KABS from re-computing the arrival functions to regeneration of the bid set of keywords along with their corresponding bids and display ranks.

U.S. Patent Application Pub. No. U.S. 2004/0068460 A1 discloses a method and system enabling advertisers to achieve a desired ordinal position of a web page link in a list of search results generated by a bid-for-position search engine on the Internet in response to a keyword search. The method involves surveying other bid-for-position search engines to collect available bid data, determining a network high bid amount for a keyword of interest and the desired position, and adjusting the advertiser's bid on the keyword to be at least as much as the network high bid amount for that keyword and desired position.

U.S. Patent Application Pub. No. U.S. 2003/0088525 A1 discloses a method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

U.S. Patent Application Pub. No. U.S. 2003/0055729 A1 discloses a method and system for allocating display space on a web page. In one embodiment, the display space system receives multiple bids each indicating a bid amount and an advertisement. When a request is received to provide a web page that includes the display space, the display space system selects a bid based in part on the bid amount. The display space system then adds the advertisement of the selected bid to the web page. The bid may also include various criteria that specify the web pages on which the advertisement may be placed, the users to whom the advertisement may be presented, and the time when the advertisement may be placed. The bid amount may be a based on an established currency or based on advertising points. The display space system may award advertising points for various activities that users perform. The activities for which advertising points may be awarded may include the listing of an item to be auctioned, the bidding on an item being auctioned, the purchasing of an item at an auction, or the purchasing of an item at a fixed price. The display space system tracks the advertising points that have been allocated to each user. When an advertisement is placed on a web page on behalf of the user, the display space system reduces the number of advertising points allocated to that user. The display space system may also provide an auto bidding mechanism that places bids for display space on behalf of the user.

U.S. Patent Application Pub. No. U.S. 2003/0055816 A1 discloses a pay-for-placement search system that makes search term recommendations to advertisers managing their accounts in one or more of two ways. A first technique involves looking for good search terms directly on an advertiser's web site. A second technique involves comparing an advertiser to other, similar advertisers and recommending the search terms the other advertisers have chosen. The first technique is called spidering and the second technique is called collaborative filtering. In the preferred embodiment, the output of the spidering step is used as input to the collaborative filtering step. The final output of search terms from both steps is then interleaved in a natural way.

U.S. Patent Application Pub. No. U.S. 2003/0105677 A1 discloses an automated web ranking system which enables advertisers to dynamically adjust pay-per-click bids to control advertising costs. The system tracks search terms which are used to market an advertiser's product or services in on-line marketing media ("OMM"). The system determines the search term's effectiveness by collecting and analyzing data relating to the number of impressions, the number of clicks, and the number of resulting sales generated by a search term at a given time period. Based on the data collected and parameters which the advertiser provides relating to the advertiser's economic factors, the system calculates a maximum acceptable bid for each search term. The system monitors the web for competitor's bids on an advertiser's search term and places bids which fall below the maximum acceptable bid.

United States Patent Application No. 2005/0223000 discloses a system and method for enabling information providers using a computer network to influence a position for a search listing within a search result list. A database stores accounts for the network information providers. Each account contains contact and billing information. In addition, each account contains at least one search listing having at least three components: a description, a search term comprising one or more keywords, and a bid amount. The network information provider may add, delete, or modify a search listing after logging into his or her account via an authentication process. The network information provider influences a position for a search listing in the provider's account by first selecting a relevant search term and entering that search term and the description into a search listing. A continuous online competitive bidding process occurs when the network information provider enters a new bid amount for a search listing. This bid amount is compared with all other bid amounts for the same search term. A rank value is generated for all search listings having that search term. The generated rank value determines where the network information provider's listing may appear on the search results list page that is generated in response to a query of the search term by a searcher at a client computer on the computer network. A higher bid by a network information provider may result in a higher rank value and a more advantageous placement.

United States Patent Application No. 2005/0065844 discloses a system and method for automating the management of an advertising campaign for a sponsored search application. An advertiser can easily manage their advertising campaign based on a budget and other information that they are most familiar with, e.g., the length of time for the campaign, desired number of total clicks during the campaign, the time zone of the campaign, keywords to be bid upon for the sponsored search application, the advertisement (copy and heading), and the URL associated with the location of the advertisement copy. With this relatively basic information provided, an example embodiment can automatically manage the bidding on both small and relatively large numbers of keywords for an advertising campaign.

United States Patent Application No. 2004/0230574 discloses a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

United States Patent Application No. 2004/0199496 discloses a presentation system accepts presentations or references to presentations from prospective presenters. Some or all of the presentations or references are stored in a database and referenced by keywords such that presentations to be presented in response to particular searches can be identified. A presentation manager handles accepting bids and settling terms between prospective presenters. The results of such processes might be stored in a presentation details database. A presentation server handles retrieving presentations from the presentation details database for presentation to users along with requests such as search results. Both the presentation manager and the presentation server can operate on a keywords-basis, wherein presentation terms specify keywords to be associated with particular presentations and the presentation server serves particular presentations based on keywords in a search query for which the presentations are to be returned. The association of keywords can be done using canonicalization so that, under certain conditions, different keywords are treated as the same keyword. Canonicalizations might include plural/singular forms, gender forms, stem word forms, suffix forms, prefix forms, typographical error forms, word order, pattern ignoring, acronyms, stop word elimination, etc. Conditions might include aspects of the search query state, such as the user's demographics, the page from which the search query was initiated, etc.

U.S. Pat. No. 6,826,572 describes a system for advertisers to efficiently manage their search listings in placement database search system includes grouping means for managing multiple categories for the search listings and query means for searching search listings. The system further includes quick-fill means for modifying an attribute in a plurality of search listings by specifying the modification at a single location. The system provides a method and system for a pay for placement database search system. The method and system include grouping and querying, one or more search listings associated with an advertiser, and providing the advertisers an ability to simultaneously modify a plurality of search listings. The advertisers also possess means to search the categories and gather statistical data for an entire category.

U.S. Pat. No. 6,704,727 describes a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

U.S. Pat. No. 6,876,997 discloses a method of generating a search result list and also provides related searches for use by a searcher. Search listings which generate a match with a search request submitted by the searcher are identified in a pay for placement database which includes a plurality of search listings. Related search listings contained in a related search database generated from the pay for placement database are identified as relevant to the search request. A search result list is returned to the searcher including the identified search listings and one or more of the identified search listings.

Thus, a computer-implemented method and system for combining keywords into logical clusters that share a similar behavior with respect to a considered dimension are needed.

BRIEF DESCRIPTION OF THE DRAWINGS

Embodiments illustrated by way of example and not limitation in the figures of the accompanying drawings, in which:

FIG. 5 illustrates an example of the metrics processed by the keyword aggregator of one embodiment.

FIG. 8 illustrates an example of a table of the data generated for each keyword.

DETAILED DESCRIPTION

Figure 1:
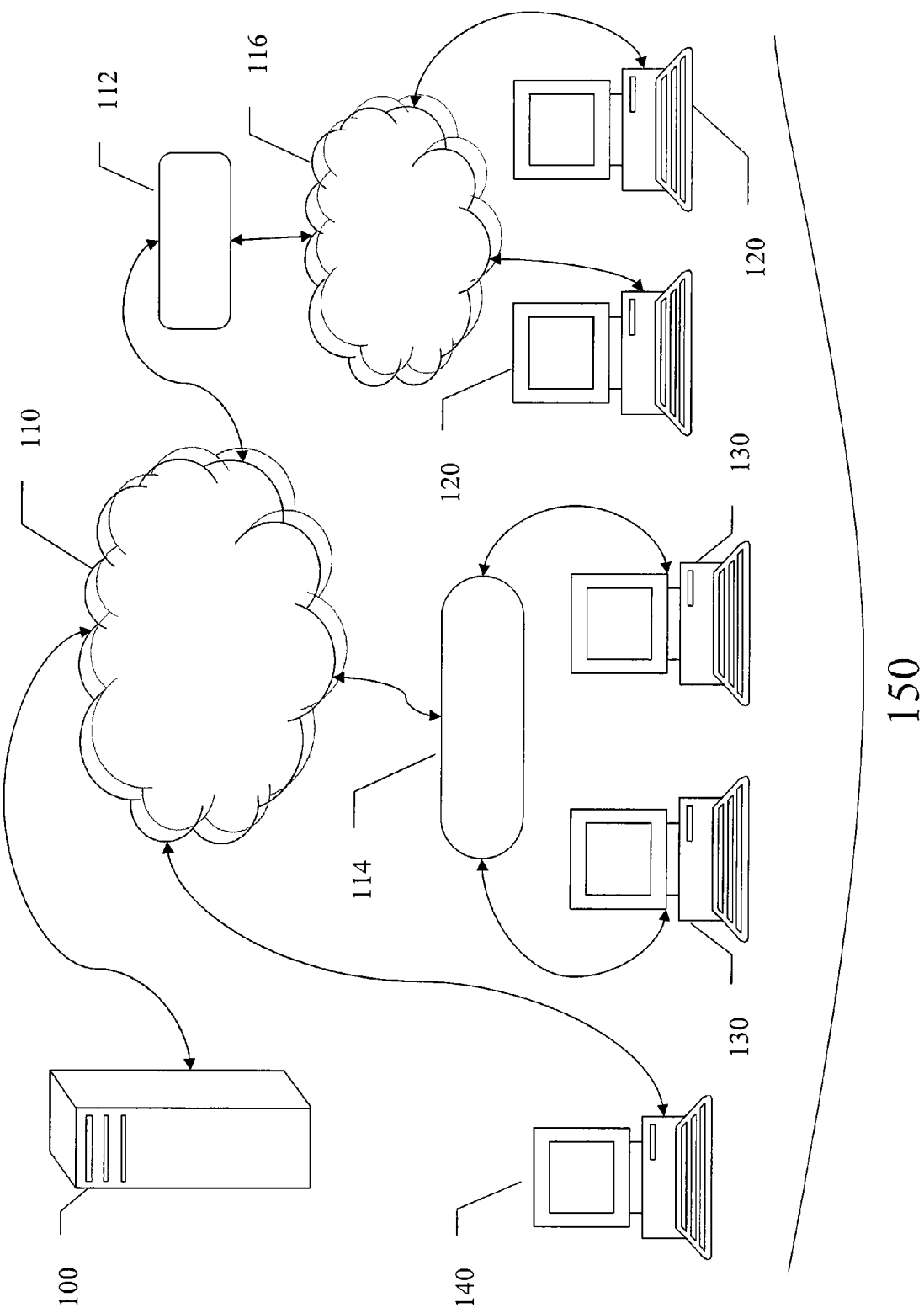
FIG. 1 is a block diagram of a network system on which an embodiment may operate.

A computer-implemented method and system for combining keywords into logical clusters that share a similar behavior with respect to a considered dimension are disclosed. In the following description, numerous specific details are set forth. However, it is understood that embodiments may be practiced without these specific details. In other instances, well-known processes, structures and techniques have not been shown in detail in order not to obscure the clarity of this description.

Various example embodiments of a computer-implemented method, article of manufacture, and system including a keyword cluster generator, various embodiments of which are describe herein, may combine keywords (denoted herein as KW) into logical clusters that share a similar behavior with respect to a considered dimension. A user of the technology described herein, denoted as a host, can use the computer-implemented method and system for keyword scoring and clustering. A data mining process is used to implement keyword affinity scoring. Clustering combines keywords into logical groups or clusters that share a similar behavior with respect to a considered dimension (or creative). A creative can be a template advertisement or message into which a keyword can be inserted. Sources for clustering techniques include: (1) "ex ante" information about a keyword (linguistic similarity, number of words in the keyword phrase, supply-side categorization etc.); (2) performance metrics (costs, clicks, return on investment (ROI), NS saturation, competitors, use of item level metrics, etc.); (3) internal sources (e.g., host search query history, host catalogues, host listings parsings, host affiliate query, catalog, and listing information, international search strings, paid search queries, etc.); and (4) external sources (e.g. Googspy, Yahoo buzz, etc.).

The computer-implemented method and system may also determine and use a correlation between different search queries in a single session. The correlation uses information based on the proximity of the different search queries and the subject matter searched in each query. The affinity between KW can be inferred based on linguistic and intent factors. For example, if a user submits a first search query (e.g. "John") and then subsequently in the same session submits a second search query (e.g. "John Smith"), a correlation can be drawn between those two keywords. This correlation can be used to form reasonable inferences related to the user behavior; because two related search queries appeared in sequence. Another example of KW affinity is "Shoes" and "Socks": a user who searched for "Socks" yesterday would be more likely to convert on keyword "Shoes" today. In other words, a user would be more likely to click on an advertisement and/or initiate a purchase related to "Shoes" today if the user had searched for the keyword "Socks" yesterday. These types of correlations can be inferred from various user search queries captured over time.

The performance metrics for a particular keyword or keyword cluster include a calculation of the value of a new user based on keywords. The effective use of advertising or messaging as related to keyword search queries enables the host to attract new users as a result of keyword based advertising. The effectiveness of a particular keyword or keyword cluster to attract new users and enhance existing users' activities is a key performance metric. One measure of this effectiveness is a Revenue per Click (RPC) scoring. If a particular keyword or keyword cluster and a related advertisement or message causes a user to click a link or icon, a certain value for that click through action can be calculated using and RPC scoring. RPC scoring is based on a predicted value for a given keyword. The keyword scoring concept includes calculating the value of a new user brought in by a specific keyword or keyword cluster and incremental activities originated from existing users. In an example embodiment, as described below, additional data can be used to actually project a value forward in time. For example, a particular click-through might be worth $1.00 a click yesterday. However, there may be strong evidence the click-through is going to be worth $1.20 a click tomorrow, because of certain consumer variables that were observed (e.g., the volume of related listings may have skyrocketed, conversion rates may be skyrocketing, and Average Selling Prices are staying flat). Conversion is the act of a user clicking, responding, or otherwise taking action related to an advertisement or message. These consumer variables suggest that the keyword is going to be worth more tomorrow and into the future. In the example computer-implemented method and system, this forward looking analysis is done with the use of data mining and statistical analysis.

Revenue Per Click Prediction Model

Revenue Per Click (RPC) prediction is one of the building blocks for keyword scoring and value prediction. For this reason, it is desirable that the model be as accurate as possible. At its core, the example RPC prediction process described herein is a statistical approach to ascribing the likely future revenue for a given click for a given keyword. There can be a large number of potential inputs to this RPC prediction, including: past revenue and past click volumes, COFA (Category of First Activity) for users who have converted on a given word, or the Bid Density by Category for a keyword historically. In the end, a large number of x-variables can be used as inputs to the model while only a few inputs may actually be part of the calculation. However, because the relative weighting of the various variables (and even the variables themselves) is likely to change over time, the example computer-implemented method and system provide an extensible and flexible approach towards the RPC calculations.

To best use the example RPC model, the input data to the RPC model may be updated on a periodic basis, thus incorporating the newest information. This periodic update can be implemented by interfacing the RPC model with the Keyword Selection Module and the Keyword Datamart (KWDM) described in related patent applications referenced above. The efficiency of the RPC model can also be improved if the RPC model receives warning alerts as soon as possible if there is a problem with the periodic retrieval of RPC model input data or by incorporating a Data Quality and Control Step to validate the inputs prior to the executing of the models.

One theme of the RPC modeling is global scalability and flexibility, which includes international country-specific, market-specific, and/or Search Engine-specific models using the same methodology as has been implemented for the RPC model in the US. This implies that the RPC model may be based on readily available data sources in every country.

Country-specific RPC models are developed and implemented for individual countries and for individual search engines to improve the regional accuracy of the RPC modeling.

Data Sourcing

As part of the periodic (e.g. daily) input data gathering process, the RPC Predictive Model may pull in keyword/search engine/user/category data from various internal and external sources that have been identified as potential predictors of a host's keywords' RPC and number of clicks. Various sources for this keyword data originate as described in the above referenced related patent application. Specifically, the keyword data can originate through the Keyword Testing Complex.

The Keyword Testing Complex is a shorthand name for the sourcing, selecting, adding, reporting, and deleting keywords cycle. The principal aim of this functionality, as described in detail below, is to facilitate the adding of good keywords and deleting of bad ones, provide control and reporting so users can easily run tests to determine the heuristics that matter in keyword selection and retention, and enable the automation of as much of the keyword testing, selection, optimization and retention cycle as possible.

Figure 3:
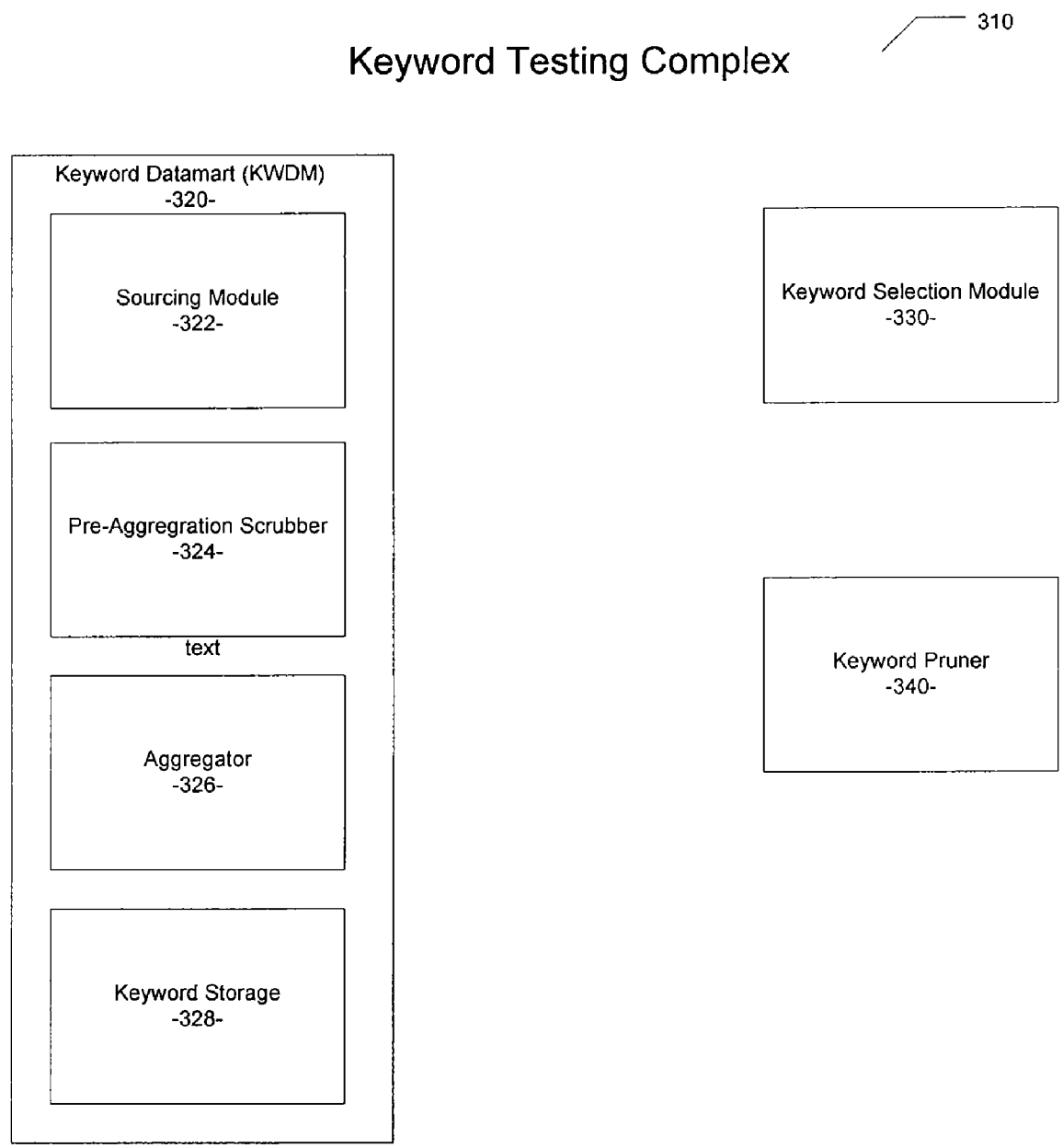
FIG. 3 illustrates the structure and components of the Keyword Testing Complex of one embodiment.
Figure 4:
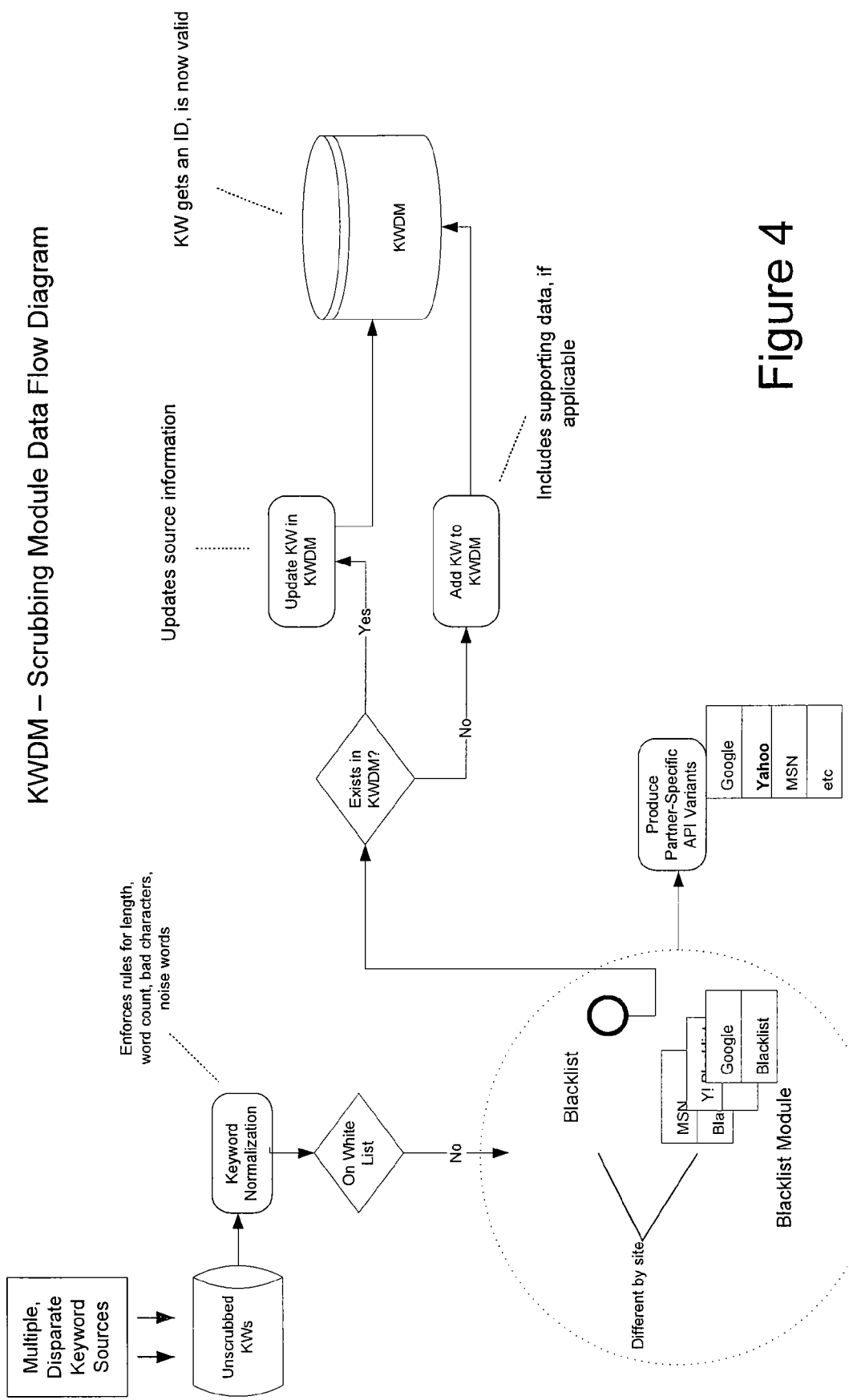
FIG. 4 illustrates the structure and flow of the keyword scrubbing module of one embodiment.

Referring to FIG. 3, a diagram illustrates the main components of the keyword test complex, according to an example embodiment. The keyword test complex 310 includes a keyword datamart, 320, a keyword selection module 330, and a keyword pruning module 340. The keyword data mart, 320 includes a sourcing module 322, a pre-aggregation scrubber 324, an aggregator 326, and keyword storage 328. The components of one embodiment of keyword datamart 320 are described in detail below.

Sourcing Module

The Keyword Sourcing Module 322 regularly pulls in keyword data from various internal and external sources that have been identified as potential sources of potentially revenue-generating keywords. Because each data source may have different dimensions and attributes, a generic and extensible data model is required. It is unlikely that many configurations settings or controls may be required to support keyword sourcing. A user of the technology described herein, denoted as a host, can use the Keyword Sourcing Module 322 to collect an initial unfiltered set of keywords from various sources. The following are some examples of important keyword sources that can be used. It will be apparent to those of ordinary skill in the art that other sources of keywords can similarly be used. Also note that there may likely be additional keyword sources that are important to various companies, organizations, countries or regions.

Internal—Host individually
        Host search query strings
        Host searches
        Host listing parsings
        Host catalogue listings
        Add a combination module as a list expansion tool (for instance have a list of action keywords (buy, cheap etc.), then match it to a give category, or combine keywords from different sources
        Keywords from other affiliated sites
    Internal—Host combined with $3^{rd}$ parties
        Affiliate query strings
        Natural search query strings
        International keywords
        Paid Search query strings
    External: (Well known sources of keywords, e.g.)
        Googspy
        Yahoo buzz
    Ad Hoc
        Generic User Upload utility for ad hoc keyword list additions
        "Keyword blender" which takes existing keyword strings and recombines the words into new keyword strings.
        Duplicate keywords may be allowed on Google if they have different Match Types as is currently available through the well-known Google interface.

As related to RPC modeling, keyword data can be sourced using the Keyword Testing Complex and the Sourcing Module 322. In addition, other keyword data sources include the following.

Performance Metrics (By Date/By Keyword):
    Cost
    Revenue
    Users performing a transaction (Transactors)
    ROI (Return on Investment) Transactions—Bids and Bids occurring within 24 hrs of click
    New Customer Acquisition
    Number of Transactions originating from newly acquired customers (activation).
    Number of Activated customers (ACRU's)
    Clicks
    Average Position
    Impressions
    View Thru value (branding)

Keyword Categorization: (Bid Categorization for Top n Categories)
    Abundance and location of merchandise relevant to the Keyword on the Host website(s) or properties (supply side), and/or relative to the categorization and location of the Host's own internal cataloging or categorization system designed to organize the Host's merchandise or services which are being advertised via a given Keyword. One example in the case of website would include:
    Category Percentage Weighting
    Site ID
    Meta Category
    Level 2 Category or Product Tier 2
    Level 3 Category or Product Tier 3
    Level 4 Category or Product Tier 4
    Level 5 Category or Product Tier 5
    Level 6 Category or Product Tier 6

Figure 6:
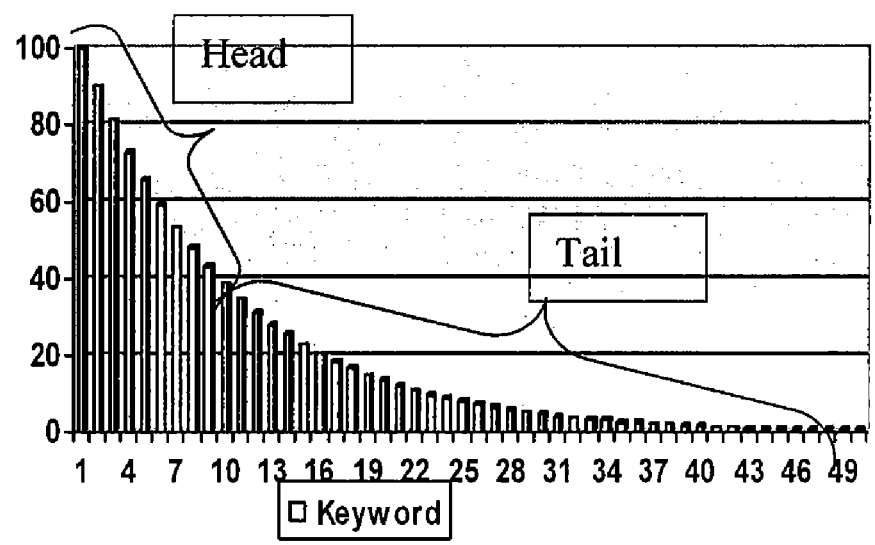
FIG. 6 illustrates an example of keyword partitioning.

Similarly, relevant Demand Side categorization data can be incorporated such as Search Categorization for Top n categories
    Category Percentage Weighting
    Site ID
    Meta Category
    Level 2 Category or Product Tier
    Level 3 Category or Product Tier
    Level 4 Category or Product Tier
    Level 5 Category or Product Tier
    Level 6 Category or Product Tier Trends or changes in the price, conversion, and other merchandising metrics from one time period to another including seasonal trends and 'on season'/'off season' product pricing differentials, relevant to a given Keyword. For example:
    Average Sale Price
    Sold-to-unsold items ratio
    Number of purchases Revenue or Gross Sales
Other external Market Indicators Customer or User Level Indicators:
  Type of users:—existing Bidders, Newly Acquired Users
  User Identifiers (IDs)
  Value of user to the Host
  Repeated Activity Level
  Geographic Location of user (e.g. Zip or Postal Code)
  CoFA—(Category of First Activity)
  Mosaic Groups based on location of user
  Demographic group based on location of user The RPC Modeling Process The RPC Modeling process of one example embodiment includes several steps as described below:

1. Data Gathering and Preparation:
   Order the list of Keywords from High activity to Low activity, and partition the list into two or more sets, where the first partition is inclusive of all Keywords with a statistically significant number of Return on Investment (ROI) events such that the density of data allows modeling for this keyword (henceforth "Head"). The remainder of the keywords can be group into one or more sets (henceforth "Tail"). An example of this partitioning is shown in FIG. 6. In the example shown, the X axis represents each keyword in the list of keywords and the Y axis represents the level of activity for each keyword in the list. Note that the "Head" partition includes Keywords with a statistically significant number of Return on Investment (ROI) events such that the density of data allows modeling for this keyword (e.g. a high level of activity). The "Tail" partition includes the remainder of the keywords in the list (e.g. a lower level of activity).

2. Pull X-Variables (See above for more details on variables) for the keywords in the "Head" partition (i.e. Head keywords)

3. Create Models from Head Keywords and score these Head keywords
   a. Depending on the density of Data, model each factor in an RPC computation, an example of which for U.S. Head keywords is provided below. Various types of models can be generated for the Head keywords. These model types can include:
      i. Short-term or transaction Revenue Model
      ii. Clicks Model
      iii. Long-term or Acquisition Revenue Model
   b. Score Head Keywords
      An example of a process for generating a score related to Head keywords is provided below.
      i. eRPC=(eRetRev+eAcqRev)/eClicks, where eRetRev is the revenue generated by the keyword for returning users, eAcqRev is the revenue generated by the keyword for newly acquired users, eClicks is the number of clicks related to the keyword, and eRPC is the computed revenue per click for the keyword.
      ii. Example

| Keyword | RPC (Revenue Per Click) |
|---|---|
| $KW_1$ | $0.34 |
| $KW_2$ | $1.12 |
| $KW_n$ | $0.28 |

Figure 7:
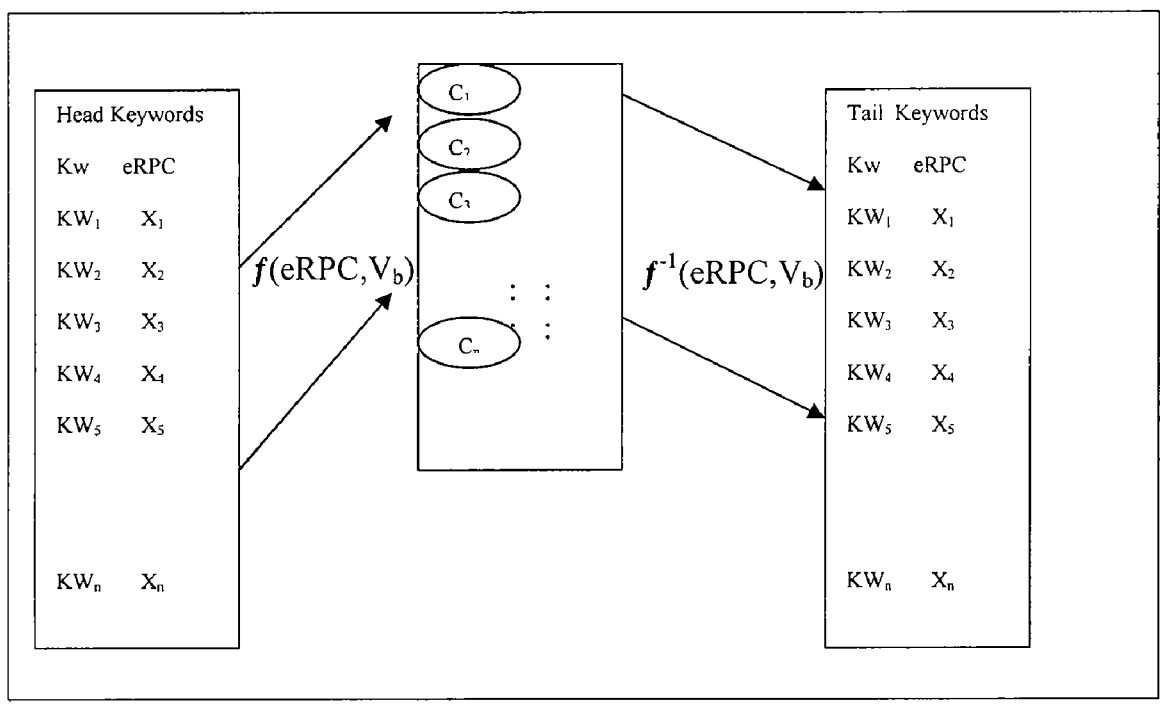
FIG. 7 illustrates an example of allocations for each head keyword and each tail keyword.

4. Once the Head Keywords have been scored with eRPC values, find a variable (Voting variable $V_b$) that is common to Head Keywords and Tail Keywords such that the variable's density is high for both sets of Keywords. Group $V_b$ into Clusters and compute the eRPC for each cluster according to the voting power or contribution of $V_b$ to each Cluster. Prescribe an eRPC for each Tail Keyword from each cluster according to the voting power of $V_b$ and the eRPC of that Cluster. An example of these allocations for each Head keyword and each Tail keyword is shown in FIG. 7, where $C_1$ to $C_n$ represent several clusters of keywords. A table of the resulting data generated for each keyword in the example is shown in FIG. 8.

5. Merging more than one $V_b$ variable:
   In the event that the Tail Terms may not be completely covered by one single Variable Vb, the eRPC of Tail Keywords can further be improved by incorporating a second, third, or more Vb variables. The method for multiple contribution Variables can be sequential (phase in a second variable when the first variable drops below given threshold r) or concurrent (assign different weights to each Vbi).
   Below is an example of Method 1, using r=10, using two Vb variables, Bid Density and Listing Density:

| Bid Count | Bid Density Weight | List Density Weight |
|---|---|---|
| >10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |

The RPC modeling process described above can, in one example embodiment, be modified by incorporating additional x-variables (e.g. seasonality, geo-targeting, and pop culture) as well as refining the Acquisition Model (described in more detail below) by incorporating more accurate Value for Confirmed Registered User (VCRU) data by keyword. Various considerations related to the additional x-variables (e.g. Pop Culture, Geo-targeting and Seasonality) are set forth below.

Pop Culture—special events, special holidays, etc.
Geo-targeting: "Snow Ski" would work better in Alaska, while "Water Ski" would work better in Miami.
Seasonality—Day of Week, Day of Year, and Hour of Day (Day-Parting)
Include these considerations in RPC calculations, e.g. increase 10% Revenue for Monday, decrease 5% in winter time, increase 25% in the week of Christmas, increase 10% for 6-10 pm, etc.

In addition, competitor information and search engine clustering can be used to further refine the RPC calculations.

VCRU by Keyword

The reasoning behind the VCRU by keyword analysis is that each keyword likely drives a different type of user to a host site. Therefore, using a single broad VCRU value for all acquired users may not be accurate. In some embodiments, the value assigned to new Acquired Confirmed Registered Users (ACRU) is all assumed to have the same value (e.g. $100). An example embodiment calculates the actual new user value for all host keywords—for example, to range from $10.00 (Playstation 2) to $150.00 (baseball cards). Analysis to date has shown that there are three natural revenue clusters among keywords:

Cluster 1 (Passion Cluster):
  Maintaining decent level activities across, for example, a one year time period.
  Cluster 1 users tend to bid on multiple categories—with Passion and Day-to-Day themes.
  They are more likely to have activities on "Clothing, Shoes & Accessories", "Collectibles", "Jewelry & Watches" "Cameras & Photo"
Cluster 2 (Low Value Cluster):
  Low value in the beginning, and remaining at a low level throughout.
  Cluster 2 users are more likely to bid on "Video Games", "DVDs & Movies", "Toys & Hobbies", "Books", etc.
Cluster 3 (High Value One-time Buyer):
  Very high value in the first a couple of months, but deteriorating quickly.
  Cluster 3 users tend to bid on high Average Selling Price (ASP) items—"Sporting Goods", "Autos/Motors", "Parts & Accessories," and expensive women's handbags, etc.

Some of the key observations behind keyword clustering include:
  keywords with themes of young and used/cheap would have lower values (e.g. used textbooks, pokemon cards, old movies, etc.);
  keywords associated with expensive items would have higher values (e.g. jewelry, auto auction, autos for sales, etc.)
  The Categories of First Activity and Last Activity of user by keywords are consistent with the 3 clusters—higher value keywords are associated with higher Average Selling Price categories
  When users type a more complicated keyword (e.g. 2002 green Toyota cars), they are more focused and determined regarding their targeted items. So tailored keywords attract less new users, but more valuable ones.

It has been determined that it may be inaccurate to predict first year VCRU by keyword due to the scarcity of data and to determine the relationship between a given keyword and the ROI events coming from direct or other non-paid search channels. At the same time, it has been observed that it may be more accurate to predict short-term (3-month) paid search bidding revenue. Assuming that this short-term paid search bidding revenue is more stable and correlated to the ultimate VCRU of a given keyword, it is desirable to define a "scaling factor" to convert the Paid Search bidding revenue into VCRU. For our purposes, $\alpha$ is the link between the three month & first year revenue. So an immediate focus can be on building acquisition models to predict 3-month paid search bidding revenue and then scale up to VCRU by a factor $\alpha$.

Similar to the VCRU by keyword analysis, there are natural clusters within the keywords with respect to the paid search bidding revenue. Even though all new users were brought in through paid search channels, different users demonstrated different behaviors. For example:
  "digital camera", "golf clubs" people are more likely bid/purchase through paid search, and bid on higher ASP items—Cluster 1 (paid search Like Affluent)
  "yugioh cards", "used books" people contribute lower revenue—Cluster 2 (Low Value Cluster)
  "playstation 2" people distribute bigger % of their activities on paid search—Cluster 3 (paid search Affinity)
  "used cars", "house for rent" people can be valuable for a host site, but few of those activities were completed through paid search—Cluster 4 (paid search Avert Affluent)

An Improved RPC Modeling Process is further refined as described below. In this improved RPC Modeling Process, the computation of eRPC is similar to the computation described above, except that the factor eAcqRev in the eRPC computation (eRPC=eRetRev+eAcqRev)/eClicks) is further refined as described in more detail below.

Acquisition Revenue Model
1. VCRU/keyword
   a. Use top keywords to create clusters by VCRU
   b. Calculate a VCRU by Cluster
      i. Example

| Cluster | VCRU |
| --- | --- |
| Cluster1 | $47 |
| Cluster2 | $22 |
| Cluster3 | $42 | c. Based on Keyword Clustering (described in more detail below), score each keyword to determine VCRU by keyword
      i. Example

| Keyword | Cluster | % | Cluster | % | Cluster | % |
| --- | --- | --- | --- | --- | --- | --- |
| $KW_1$ | 1 | 50 | 2 | 30 | 3 | 20 |
| $KW_2$ | 1 | 76 | 2 | 18 | 3 | 6 |
| $KW_n$ | 1 | 12 | 2 | 67 | 3 | 21 |

2. Alpha/keyword
   a. Score all host keywords to obtain paid search bidding Revenue/keyword
   b. Calculate $\alpha$ keyword for all host keywords
3. Predict Three Months paid search bidding revenue
   a. Score each keyword utilizing retention revenue, clicks, and acquisition components.
4. Cluster Data for Tail Scoring
   a. Score each Level 3 Category with Average RPC—Based on Bid density
      i. Example

| Category | RPC |
| --- | --- |
| $Cat_1$ | $0.37 |
| $Cat_2$ | $0.43 |
| $Cat_n$ | $0.23 |

5. Map each tail term to top 10 Level 3 categories
   a. Pull category density based on density of ROI events or Search results
      i. First pass based on host site search Bid density (better)
      ii. Second pass based on host site search View Item Density (If Count(Bids) under a certain threshold)
      iii. Combine Bid and View Item density together to complete a single score by Keyword

| Bid Count | Bid Density Weight | List Density Weight |
|---|---|---|
| >10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 | iv. Example

| Keyword | Cat1 | Cat1 % | Cat2 | Cat2 % | ... | Cat10 | Cat10 |
|---|---|---|---|---|---|---|---|
| $KW_{100,001}$ | $Cat_{001}$ | 72% | $Cat_{002}$ | 23% | | $Cat_{010}$ | 2% |
| $KW_{100,002}$ | $Cat_{032}$ | 60% | $Cat_{023}$ | | | $Cat_{129}$ | |
| $KW_n$ | $Cat_{005}$ | 32% | $Cat_{429}$ | | | $Cat_{901}$ | |

6. Score each Tail term according to following computation:

$$RPC_{Tail} = P_{Cat1} * eRPC_{Cat1} + P_{Cat2} * eRPC_{Cat2} + \ldots + P_{Cat10} * eRPC_{cat10} \quad \text{a.}$$

where the Revenue per Click for Tail keywords ($RPC_{Tail}$) is a summation of the computed revenue per click for each associated category ($eRPC_{Catn}$) multiplied by the predicted category revenue ($P_{Catn}$).

Keyword Clustering

Keyword Clustering allows a business to make quicker decisions based on sparse data and to find natural groupings of keywords. Clustering has many applications within Paid Search systems. Essentially, the example keyword clustering techniques use large amounts of data collected about each keyword. As such, keyword clustering uses the data gathered and processed by the Keyword Testing Complex 310 described in detail in a related patent application referenced above. The method and system may combine keywords into logical groups or clusters that share similar behavior with respect to a considered dimension (e.g. creative). A creative can be a template advertisement or message into which a keyword can be inserted. It is possible that some keyword clusters may be useful for multiple purposes (e.g. both Creative and Landing Page optimization may use the same clusters); but it is better to assume that each dimension may require its own tailored clustering approach.

In various embodiments, there are two unique ways of keyword clustering based on user characteristics: one is based on user demographic profiles or Keyword "Personas", and the other one is based on user search objectives or Keyword "Purposes".

Keyword "Personas" (demographic profiles) clusters can be developed by utilizing advanced clustering techniques. For example, users typed Keyword "Golf Clubs", "Gucci Bags" and "Playstation 2" would have significantly different demographic characteristics. Designing targeted Creative and landing Pages for different KW "Personas" could improve user experience dramatically and thereby increase conversions (i.e. the user click through of a related advertisement or the user initiation of a transaction based on a targeted creative and/or landing page).

Keyword "Purposes" clusters can be developed by identifying the objectives or incentives of the searches.

"Value Oriented" clusters: bargain hunters seeking good deals, i.e. "Cheap DVD", "Used Golf Clubs", etc.

"Convenience" clusters: one click-away and with more choices. Those users would more prefer precise and clear Creative and related Landing Pages.

"Hard-to-find" clusters: one of the kinds. Those users may have specific types of products in mind, or look for uncommon/unpopular items.

Examples of keyword sources for the keyword clustering techniques described herein are provided above in relation to data sourcing and the Keyword Datamart (KWDM) provided by the Keyword Testing Complex 310 as described herein and in a related patent application referenced above.

Keyword Data Aggregation Module (Aggregator)

Keywords in the KWDM 320 may contain various levels of dimension data. For example: 1) global dimensions (e.g. linguistic dimensions), 2) traffic dimensions (internal and external data), 3) clustering dimensions, and 4) source specific metrics. These dimensions are described in more detail below. Because many of these dimensions change from day to day, the aggregator 326 defines a time period of measurement for each metric. It may not be necessary to repopulate all of these metrics every day for every keyword. A weekly, monthly or quarterly refresh may be sufficient in some cases. A mechanism to track the source (and number of occurrences per source) by keyword is also a desired feature. As examples of dimensions (non-exhaustive):

a. Global Dimensions
    component words
    number of words
    "fingerprint": the keyword's words sorted alphabetically, so that "ipod mini" and "mini ipod" would map to the same fingerprint—this may be used to generate simple linguistic matches
    Categorization: the propensity of a given keyword to belong to each host site category in the category hierarchy (e.g. product grouping)
    Part of Speech (noun, verb, adjective, etc)
    Similar to part of speech—action words (e.g. buy, sell, etc.)—allows for keyword combinations
    linguistic affinity matching (e.g. a score for keyword pairs which indicates their "likeness" based on the words they share)
    Predicted Revenue per Click (RPC) (from "best available" RPC model)
    number of host search results
    number of searches on yahoo in a time period
    Purged/Tested status flag
b. Traffic Dimensions
    Trafficked on Search Engine xyz
    Sourced from Site abc
    By Search Engine
        Current Cost per Click (CPC) (bid) (if trafficked)
        Avg. CPC (last 30 days)
        Avg. Position (last 30 days)
        Cost
        Revenue
        Clicks
        Impressions
        Bids
        Confirmed Registered Users (CRU)
        Active Confirmed Registered Users (ACRU)
    Host Search Volume
c. Clustering Dimensions
    Category Affinity (potentially multiple approaches)
    Value for Confirmed Registered User (VCRU) by keyword
    Revenue per Click (RPC) Predictive Model Score Predicted RPC
Predicted Clicks
Creative/Landing Page Cluster
Metrics as required to support clustering
  User Metrics
  Category Metrics
d. Source-Specific Dimensions (extensible)
  Affiliate queries
    Affiliate ID
  International
    Country
    Revenue
    Clicks
  Natural search
    Revenue
    Cost
  Host searches
    number of queries in prior unit of time
    number of bids resulting from word
    number of listings resulting from word
    number of registrations resulting from word
    number of watches resulting from word
    Revenue resulting from word
  Query String map
    Map of query strings which have been seen associated with keyword strings in paid search data Referring to FIG. 5, an example of the metrics processed by aggregator 326 is illustrated. Because many of these statistics change from day to day, the aggregator 326 documents from what period of time the statistic is taken. It may not be necessary to repopulate all of these statistics every day. A monthly or quarterly refresh may be sufficient. For statistics involving the actual cost and revenue for the trafficked word for the host, the aggregator 326 incorporates new data with the old data. If a keyword comes in more than once from the same source, the aggregator 326 can increment the number in the appropriate source column. If the keyword is seen from a new source, the aggregator 326 increments the relevant source column.

Keyword Selection Module (Selector)

The Keyword Selection Module 330 is shown in FIG. 3. In one embodiment, there are two ways to select keywords to be added: manually and automatically.

Manual Method
    The user can run ad hoc queries on any of the fields to retrieve any set of keywords. Standard logic is supported (e.g. and, or's, joins, etc.).
    The user can sort according to any of the fields in the aggregator 326.
    The user can export the query result
    The user can create a list with the query results which can then be used to bid that group of keywords in a like manner
    The user can save query parameters
  Automatic Method
    The user can specify which metrics have been deemed to be useful predictors for valuable keywords (via heuristic testing or based on external models), and the keyword testing complex 310 then uses these criteria to automatically select keywords to be trafficked. This query can be generated by a configurable set of criteria that can be pre-set and executed at regular intervals.
    Any other metric tracked by the aggregator 326 can be available as an input into the automatic keyword selector 330.

The keyword clustering functionality may include the capability to update/re-cluster the keywords on a frequent basis (with frequency determined based on the requirements of the specific application of the cluster) as well as the ability to re-use clusters for additional purposes. For example, clustering can also have important uses with respect to Reporting, Legal Requirements (fair use of brands issue) and suppression lists, etc.

Clustering may be invisible to the search engines. It is useful to cluster keywords together as part of related keyword optimization efforts (e.g. creative, landing page) and partly due to the search engine's limitations. It is also useful for keywords to belong to a more tailored cluster (e.g. a demographic or sociological target). Keyword clustering enables optimization (e.g. group keywords with similar profile).

The host could have an existing environment rich with keyword traffic and maintain a hierarchical product and service catalog with multiple levels in each of a variety of categories. As a result, the host site may have millions of keywords with host specific information associated:

Demand Side (Potential Buyer Data): Number of Searches in different Leaf Categories for each keyword
Supply Side: Number of Listings in different Leaf Categories for each keyword Based on the match between a new keyword and a host category (either Supply or Demand side), the example embodiments may forecast the RPC for any new keyword searched at the host site. The RPC can be used to determine the optimal Cost per Click (CPC) of a new keyword in the Search Engine. The following example of category and RPC data will illustrate this point:

| Keyword | % in Leaf Category (Pi) | Leaf Category | Avg RPCi in Category |
| --- | --- | --- | --- |
| Sony DVD | 80% | Japan Electronics | $ 0.80 |
|  | 10% | Movie & Video Games | $ 0.20 |
|  | 5% | Collectibles | $ 2.00 |
|  | 5% | TV P&A | $10.00 |

So in the example above, the Expected RPC can be calculated as follows:

$$\sum_{i=1}^{N} Pi * RPCi$$

$$\text{Expected}(RPC)_{Sony\ DVD} = (P1 * AvgRPC1) + (P2 * AvgRPC2) + (P3 * AvgRPC3) + (p4 * AvgRPC4)$$
$$= \$1.26$$

This Expected RPC can then be fed back into the KWDM and then used as an input into the keyword selection module 330.

Keyword Pruning

Many keywords draw a lot of clicks with few ROI events (e.g. bids/CRUs). For example, many keywords may have a calculated RPC below an established minimum threshold level of a cost per click (CPC). In most cases, these keywords can be pruned (e.g. removed or rejected for retention in the KWDM) or paused. In one embodiment, keywords with expected (RPC)<min(CPC) are pruned/paused.

One key to success in automatic pruning is to balance immediacy or urgency of pruning with statistical significance. "Check-Point" methodology provides the optimal solutions: build robust models to predict the propensity of keywords being unprofitable at each of the check-points, and re-score the keywords on a periodic basis (e.g. daily) incorporating the newest information.

A configurable threshold confidence level for keyword pruning can be defined. Then, on a periodic basis (again configurable), each keyword is compared to see if a statistically significant conclusion can be reached based on the confidence level. For example, if it is determined that with an 80% confidence level that the expected RPC is below the minimum CPC, that keyword may be pruned from the keyword portfolio.

In addition, to facilitate deleting or pausing unprofitable keywords in a timely manner, the pruning predictive models and related scores provide a valid and accurate tool to improve RPC models, especially for those non-high volume keywords.

Geographic/Demographic Clustering

With respect to Geographic and Demographic clustering, natural keyword clustering can be determined among demographic variables used in search engines based on the user's gender, age, lifestyle, wealth, income, time-of-day behavior, and the like. Using clustering, clusters of users who have a significantly higher than expected RPC than the rest of the population can be identified. This information can be used to adjust a keyword bidding strategy accordingly. This is where the same keyword may belong to one or more different clusters. For example, the keyword "Gucci Bag" may belong to both the clothing category and the demographic cluster.

Creatives

A creative can be a template advertisement or message into which a keyword can be inserted. The section below describes to where creatives are attached, how they are tracked and trafficked, and how to report and optimize the creatives. New keywords uploaded into the system adopt their cluster's default creative. Users have the option of overriding this and defining a creative at a keyword level. If a new keyword cannot be auto-categorized, the keyword may roll into the uncategorized cluster. This cluster may also have a default creative that can be modified, if necessary. All creatives can accommodate keyword insertion (e.g. Bargain {KeyWord} on Site ABC). An example embodiment also includes the ability to attach more than one creative per cluster, which can be rotated equally. An example embodiment may also allow the upload of more than one creative per keyword. An important consideration is that all the creative clustering can be changed or reconfigured for a given keyword on a frequent (e.g. daily/weekly) basis. In addition, the clustering models themselves can be changed on a frequent basis.

Creative Keyword Scrubbing:

A keyword does not always fit neatly into the creative when automatic keyword insertion is used (e.g. "Bargain the towel on Site ABC". As such, there is value in scrubbing a keyword before it is inserted into a creative, to ensure correct grammar, spelling and to make sure the resulting creative makes sense. This increases the host's brand value as well as the search user experience. Therefore in one embodiment, the original keyword is scrubbed before it is inserted into the creative. A scrub list can be used to remove extraneous words. The scrub list may remove keywords such as: the, a, bargain, cheap, buy, how to buy, find, cool, great, sell, etc. The scrub list is configurable as new scrub words become known. The goal is to strip extraneous keywords so the final Creative does not read "Bargain the towel on Site ABC", but rather "Bargain towels on Site ABC".

Landing Pages

Connected with keyword categorization or clustering is the concept of the landing page. The landing page can be defined via a template as a keyword related search result page (e.g. gallery view, lowest price first or ending soonest), as category index page, as category search result page or home page—based on each country's specific site category structure. This includes the definition of where the keywords may link, the tracking, reporting and optimization of landing pages. This can take place on a keyword level or on a cluster level. An example embodiment may also provide the option to define custom URLs for special clusters or keywords. This may be the case for special clusters, special promotions, seasonal keywords, generic keywords, host related tools/promotion, and the like. Special landing pages are, for example, an education page, a dynamic landing page, a sign in page, or the like. This definition can be on keyword level or cluster level. An example embodiment also enables the definition of a landing page on a country by country basis. An example embodiment allows the definition of a default landing page in case a linked URL connects to a zero result page. The default landing page can be the category index page or the homepage or a listing page (e.g. level 3, 2 or 1 depending on the number of listings). The default landing page can be configured overall or per cluster. In case of misspellings or fill words (like "cheep", "cool"), an example embodiment links to the landing page of the correct keyword without fill words.

A consideration is that all the landing page definitions for clustering can be changed or reconfigured for a given keyword on a frequent (e.g. daily/weekly) basis. In addition, the clustering models themselves can be changed on a frequent basis.

The user may be able to track the landing pages for optimization and test purposes. An example embodiment provides a separate performance tracker for landing pages. For a better reporting of landing page types, the example embodiment creates IDs for every type of landing page. The example embodiment can pull the landing page reports on demand by partner, cluster and on keyword level. The metrics can be defined on country specific needs (ROI or revenue). Based on the reporting data, the example embodiment allows the optimization of landing pages (manually with exception reports or automated). The metrics for optimization can be defined on country specific needs (ROI or revenue).

Referring now to FIG. 1, a diagram illustrates the network environment in which an example embodiment may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 2A:
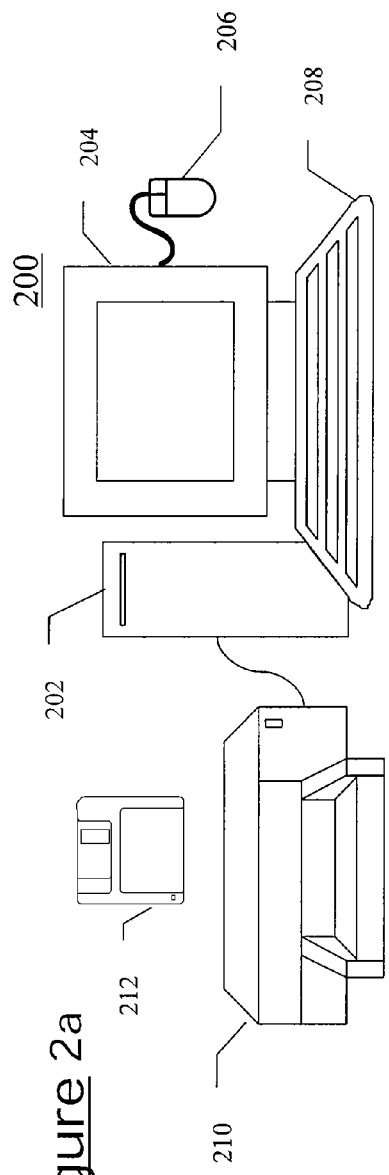
FIGS. 2a and 2b are a block diagram of a computer system on which an embodiment may operate.
Figure 2B:
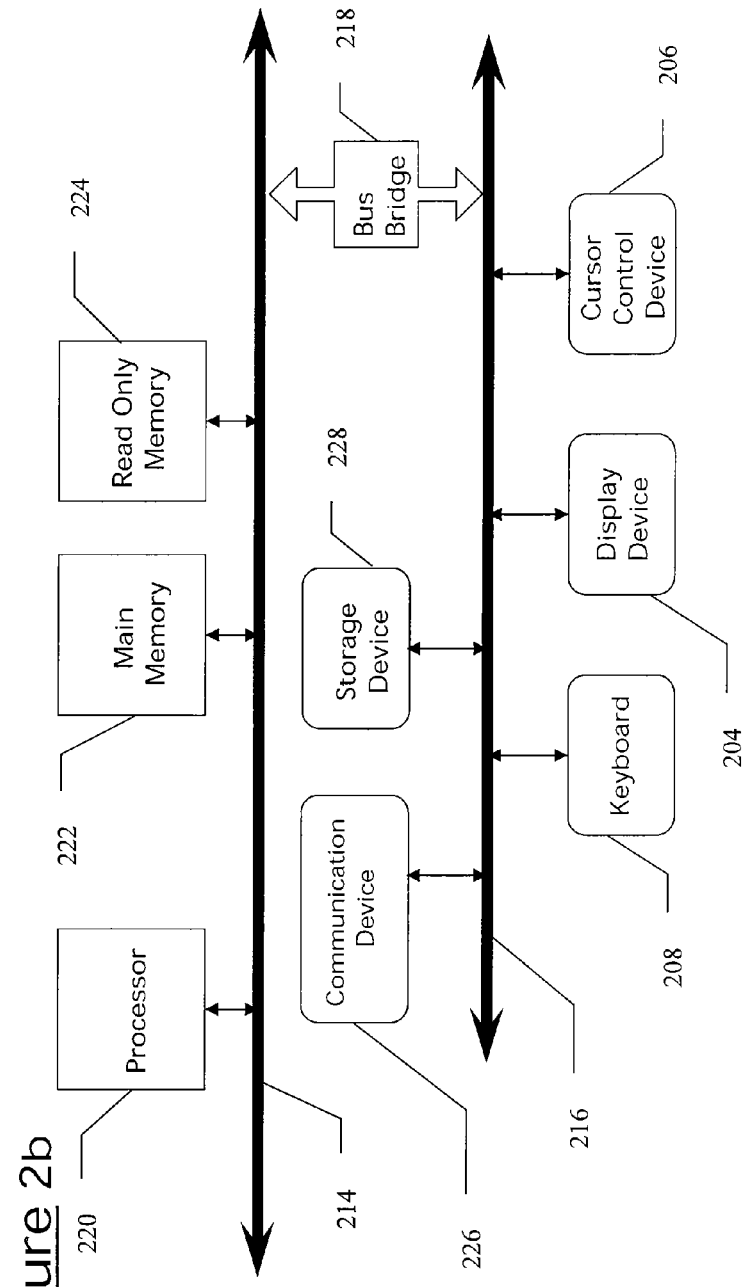

Having briefly described one embodiment of the network environment in which an example embodiment may operate, FIGS. 2a and 2b show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of an example embodiment includes software, information processing hardware, and various processing steps, which will be described below. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of user interface presentations may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented method and system for combining keywords into logical clusters that share a similar behavior with respect to a considered dimension are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:

receiving a list of keywords via a data network interface for processing by a processor of a computer system;

ordering the list of keywords from high activity to low activity, the high activity corresponding to keywords with a statistically significant number of return on investment (ROI) events, the ROI events corresponding to revenue-generating events;

partitioning the list into at least two sets, a head partition including keywords with an activity level above a predefined threshold, a tail partition including the remainder of the keywords in the list;

modeling the keywords in the head partition based on a set of variables, the modeling including generating a revenue per click (RPC) value prediction for each of the keywords in the head partition, the RPC value prediction being based on the set of variables, past keyword revenue performance data, and historical bid density by category for each keyword;

scoring the keywords in the head partition based on the modeling; and clustering head partition keywords with tail partition keywords having at least one common variable into at least one keyword cluster.

2. The method as claimed in claim 1 wherein the set of variables include seasonality variables.

3. The method as claimed in claim 1 wherein the set of variables include geo-targeting variables.

4. The method as claimed in claim 1 wherein the set of variables include demonstrated user behavior variables.

5. The method as claimed in claim 1 wherein the set of variables include pop culture variables.

6. The method as claimed in claim 1 further including generating a revenue per click (RPC) value for the at least one keyword cluster.

7. The method as claimed in claim 6 further including incorporating value for confirmed registered user (VCRU) data into the generated RPC value.

8. The method as claimed in claim 6 further including incorporating paid search bidding revenue data into the generated RPC value.

9. The method as claimed in claim 1 further including creating the at least one keyword cluster based in part on value for confirmed registered user (VCRU) data.

10. The method as claimed in claim 1 wherein the RPC value prediction being further based on a category of first activity for users who have converted on a given keyword.

11. An article of manufacture comprising at least one machine readable storage medium having one or more computer programs stored thereon, the one or more computer programs when executed causing a machine to:
order a list of keywords from high activity to low activity, the high activity corresponding to keywords with a statistically significant number of return on investment (ROI) events, the ROI events corresponding to revenue-generating events,
partition the list into at least two sets, a head partition including keywords with an activity level above a predefined threshold, a tail partition including the remainder of the keywords in the list,
model the keywords in the head partition based on a set of variables, the modeling including generating a revenue per click (RPC) value prediction for each of the keywords in the head partition, the RPC value prediction being based on the set of variables, past keyword revenue performance data, and historical bid density by category for each keyword,
score the keywords in the head partition based on the modeling, and
cluster head partition keywords with tail partition keywords having at least one common variable into at least one keyword cluster.

12. The article of manufacture as claimed in claim 11 wherein the set of variables include seasonality variables.

13. The article of manufacture as claimed in claim 11 wherein the set of variables include geo-targeting variables.

14. The article of manufacture as claimed in claim 11 wherein the set of variables include demonstrated user behavior variables.

15. The article of manufacture as claimed in claim 11 wherein the set of variables include pop culture variables.

16. The article of manufacture as claimed in claim 11 wherein the one or more computer programs when executed causing the machine to generate a revenue per click (RPC) value for the at least one keyword cluster.

17. The article of manufacture as claimed in claim 16 wherein the one or more computer programs when executed causing the machine to incorporate value for confirmed registered user (VCRU) data into the generated RPC value.

18. The article of manufacture as claimed in claim 16 wherein the one or more computer programs when executed causing the machine to incorporate paid search bidding revenue data into the generated RPC value.

19. The article of manufacture as claimed in claim 11 wherein the one or more computer programs when executed causing the machine to create the at least one keyword cluster based in part on value for confirmed registered user (VCRU) data.

20. The article of manufacture as claimed in claim 11 wherein the RPC value prediction being further based on a category of first activity for users who have converted on a given keyword.

21. A system comprising:
a processor;
a memory coupled to the processor to store information related to keywords; and
a keyword cluster generator, in data communication with the processor and the memory, the keyword cluster generator to order a list of keywords from high activity to low activity, the high activity corresponding to keywords with a statistically significant number of return on investment (ROI) events, the ROI events corresponding to revenue-generating events, partition the list into at least two sets, a head partition including keywords with an activity level above a predefined threshold, a tail partition including the remainder of the keywords in the list, model the keywords in the head partition based on a set of variables, the modeling including generating a revenue per click (RPC) value prediction for each of the keywords in the head partition, the RPC value prediction being based on the set of variables, past keyword revenue performance data, and historical bid density by category for each keyword, score the keywords in the head partition based on the modeling, and cluster head partition keywords with tail partition keywords having at least one common variable into at least one keyword cluster.

22. The system as claimed in claim 21 wherein the set of variables include seasonality variables.

23. The system as claimed in claim 21 wherein the set of variables include geo-targeting variables.

24. The system as claimed in claim 21 wherein the set of variables include demonstrated user behavior variables.

25. The system as claimed in claim 21 wherein the set of variables include pop culture variables.

26. The system as claimed in claim 21 to generate a revenue per click (RPC) value for the at least one keyword cluster.

27. The system as claimed in claim 26 to incorporate value for confirmed registered user (VCRU) data into the generated RPC value.

28. The system as claimed in claim 26 to incorporate paid search bidding revenue data into the generated RPC value.

29. The system as claimed in claim 21 to create the at least one keyword cluster based in part on value for confirmed registered user (VCRU) data.

30. The system as claimed in claim 21 wherein the RPC value prediction being further based on a category of first activity for users who have converted on a given keyword.

* * * * *

UNITED STATES PATENT AND TRADEMARK OFFICE
CERTIFICATE OF CORRECTION

PATENT NO. : 7,792,858 B2
APPLICATION NO. : 11/427090
DATED : September 7, 2010
INVENTOR(S) : Xiaofeng Tang et al.

It is certified that error appears in the above-identified patent and that said Letters Patent is hereby corrected as shown below:

In column 1, line 6, below "Title" insert
-- Cross-Reference to Related Patent Applications
This patent application is related to U.S. Patent Application Serial No. 11/427,097, filed on June 28, 2006, and titled, "A Computer-implemented Method and System for Enabling the Automated Selection of Keywords for Rapid Keyword Portfolio Expansion", and assigned to the same assignee as the present patent application.
This patent application is related to U.S. Patent Application Serial No. 11/517,886, filed on September 8, 2006, and titled, "A Computer-implemented Method and System for Managing Keyword Bidding Prices", and assigned to the same assignee as the present patent application. --.

In column 1, lines 31-43, above "Technical Field" delete
"Cross-Reference to Related Patent Applications
This patent application is related to U.S. Patent Application Serial No. 11/427,097, filed on June 28, 2006, and titled, "A Computer-implemented Method and System for Enabling the Automated Selection of Keywords for Rapid Keyword Portfolio Expansion", and assigned to the same assignee as the present patent application.
This patent application is related to U.S. Patent Application Serial No. 11/517,886, filed on September 8, 2006, and titled, "A Computer-implemented Method and System for Managing Keyword Bidding Prices", and assigned to the same assignee as the present patent application.".

In column 2, line 50, delete "Colonago" and insert -- Colnago --, therefor.

In column 15, line 14, after "Watches"" insert -- , --.

In column 16, line 11, after "eClicks" delete ")".

In column 17, line 19, after "Cat10" insert -- % --.

Signed and Sealed this

Ninth Day of November, 2010

David J. Kappos
*Director of the United States Patent and Trademark Office*